United States Patent
Xu

(10) Patent No.: US 10,318,889 B2
(45) Date of Patent: Jun. 11, 2019

(54) TARGETED DATA AUGMENTATION USING NEURAL STYLE TRANSFER

(71) Applicant: KONICA MINOLTA LABORATORY U.S.A., INC., San Mateo, CA (US)

(72) Inventor: Ting Xu, Foster City, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 109 days.

(21) Appl. No.: 15/633,288

(22) Filed: Jun. 26, 2017

(65) Prior Publication Data

US 2018/0373999 A1 Dec. 27, 2018

(51) Int. Cl.
| | |
|---|---|
| G06K 9/00 | (2006.01) |
| G06N 20/00 | (2019.01) |
| G06T 3/00 | (2006.01) |
| G06T 11/00 | (2006.01) |

(52) U.S. Cl.
CPC ......... *G06N 20/00* (2019.01); *G06K 9/00765* (2013.01); *G06T 3/0006* (2013.01); *G06T 11/001* (2013.01)

(58) Field of Classification Search
None
See application file for complete search history.

(56) References Cited

U.S. PATENT DOCUMENTS

| | | | |
|---|---|---|---|
| 9,576,351 B1 | 2/2017 | Barzel et al. | |
| 9,594,977 B2 | 3/2017 | Lin et al. | |
| 9,892,344 B1 * | 2/2018 | Tran | G06K 9/66 |
| 2015/0379422 A1 | 12/2015 | Chandler | |
| 2017/0286809 A1 * | 10/2017 | Pankanti | G06K 9/66 |

OTHER PUBLICATIONS

Peng et al., "Synthetic to Real Adaptation with Generative Correlation Alignment Networks," arXiv preprint arXiv:1701.05524v3, Mar. 18, 2017.
Charalambous et al., "A data augmentation methodology for training machine/deep learning gait recognition algorithms," arXiv preprint arXiv:1610.07570v1, Oct. 24, 2016.

(Continued)

*Primary Examiner* — Hadi Akhavannik
(74) *Attorney, Agent, or Firm* — Chen Yoshimura LLP

(57) ABSTRACT

A method for training a deep neural network (DNN) to perform a specified task with respect to images captured by a target camera, including: using an image captured by the target camera as a style target image, training a style transformer network to perform a style transformation that transforms any photorealistic input image into a transformed image that has contents of the input image, maintains photorealistic quality of the input image, and has a style that matches a style of the style target image; using the trained style transformer network to transform training image of an original training dataset into transformed training images; labeling the transformed training images with the training labels of the corresponding training image of the original training dataset, to form an augmented training dataset; and using the augmented training dataset to train the DNN to perform the specified task.

11 Claims, 2 Drawing Sheets

(56) References Cited

OTHER PUBLICATIONS

Gatys et al., "A Neural Algorithm of Artistic Style," arXiv preprint arXiv:1508.06576v2, Sep. 2, 2015.
Johnson et al., "Perceptual Losses for Real-Time Style Transfer and Super-Resolution", arXiv preprint arXiv:1603.08155v1, Mar. 27, 2016.
Johnson et al., "Perceptual Losses for Real-Time Style Transfer and Super-Resolution: Supplementary Material", http://cs.stanford.edu/people/jcjohns/papers/eccv16/JohnsonECCV16Supplementary.pdf, Mar. 27, 2016.
Luan et al., "Deep Photo Style Transfer," arXiv preprint arXiv:1703.07511v3, Apr. 11, 2017.
Simonyan et al., Very Deep Convolutional Networks for Large-Scale Image Recognition, ICLR 2015.

\* cited by examiner

TARGETED DATA AUGMENTATION USING NEURAL STYLE TRANSFER

BACKGROUND OF THE INVENTION

Field of the Invention

This invention relates to deep neural networks, and in particular, it relates to a data augmentation method for generating labeled training data for deep neural networks using style transfer.

Description of Related Art

Artificial neural networks are used in various fields such as machine leaning, and can perform a wide range of tasks such as computer vision, speech recognition, etc. An artificial neural network is formed of interconnected layers of nodes (neurons), where each neuron has an activation function which converts the weighted input from other neurons connected with it into its output (activation). In a learning (or training) process, training data are fed into to the artificial neural network and the adaptive weights of the interconnections are updated through the learning process. After a neural network is trained, data to be processed is inputted to the network to generate processing results. Training data is formed of data of the same nature as the data to be processed (e.g. images) along with labels that indicate what the processing result should be for each input data. For example, if a neural network is being trained to recognize cats and dogs in images, the training data would include images contain cats or dogs along with a label for each training image indicating whether it contains a cat or a dog.

Training a deep neural network (DNN) requires a large amount of labeled training data to avoid model overfitting and to improve model generalizability. To fully utilize existing labeled training data, it is a common practice to augment training data (aka data augmentation) by label preserving transformations on the original training dataset to generate additional training data. For example, for training a DNN for the task of image recognition, an existing training image can be cropped for the labeled object, geometrically transformed (translation, rotation, scaling, shearing, lens-distortion, etc.), transformed in color or intensity, and/or applied with various types of noise to generate a new training image with the same label. Data augmentation enlarges the pool of training data without the need to provide additional training labels. The additional training data produced by such methods is "general" in the sense that they are not transformed into a particular "style".

Depending on the capacity of the DNN model, the number of training data needed can be of magnitude of millions to avoid over-fitting. In practice, to train a DNN for a particular task, e.g., to recognize particular objects, the DNN may be first pre-trained on a very large training dataset (referred to as a general dataset, such as ImageNet, which is a publically available image database in which the images have been labeled), and then trained (fine-tuned) on an application-specific training dataset, which is typically much smaller (referred to as a custom dataset). This approach is called transfer learning. Usually the custom dataset needs additional labeling. Depending on the similarity between the custom dataset and general dataset, the size of custom dataset can be in the thousands. Manually labeling the custom dataset is costly, tedious, and often error-prone.

It has been proposed to use synthetic images rendered from 3D CAD models for data augmentation. One challenge for this approach is to generate photorealistic images. For example, X. Peng et al., "Synthetic to Real Adaptation with Generative Correlation Alignment Networks," arXiv preprint arXiv:1701.05524v3, 18 Mar. 2017, describes a Deep Generative Correlation Alignment Network (DGCAN) for synthesizing images using a domain adaption algorithm.

C. Charalambous et al., "A data augmentation methodology for training machine/deep learning gait recognition algorithms," arXiv preprint arXiv:1610.07570v1, 24 Oct. 2016, describes "a simulation-based methodology and a subject-specific dataset which can be used for generating synthetic video frames and sequences for data augmentation" for gait recognition (Abstract).

U.S. Pat. Appl. Pub. No. 2015/0379422, entitled "Data augmentation based on occlusion and inpainting," describes "Augmenting a dataset in a machine learning classifier . . . One example is a system including a training dataset with at least one training data, and a label preserving transformation including an occluder, and an inpainter. The occluder occludes a selected portion of the at least one training data. The inpainter inpaints the occluded portion of the at least one training data, where the inpainting is based on data from a portion different from the occluded portion." (Abstract.)

Style transfer is a type of image transformation that transforms an input image into an output image that has the semantic content of the input image but the "style" of a reference image. For example, L. A. Gatys et al., "A Neural Algorithm of Artistic Style," arXiv preprint arXiv: 1508.06576v2, 2 Sep. 2015 ("Gatys et al. 2015"), describes a deep neural network model that can transform an arbitrary image into an image having a particular artistic style, for example, the style of a van Gogh painting. "The system uses neural representations to separate and recombine content and style of arbitrary images, providing a neural algorithm for the creation of artistic images." (Abstract.)

J. Johnson et al., "Perceptual Loss for Real-Time Style Transfer and Super-Resolution," arXiv preprint arXiv: 1603.08155v1, 27 Mar. 2016 ("Johnson et al. 2016"), describes a style transfer method that can generate artistic images similar to the results of Gatys et al. 2015 but is said to be three orders of magnitude faster. "We train feed-forward transformation networks for image transformation tasks, but rather than using per-pixel loss functions depending only on low-level pixel information, we train our networks using perceptual loss functions that depend on high-level features from a pretrained loss network. During training, perceptual losses measure image similarities more robustly than per-pixel losses, and at test-time the transformation networks run in real-time." (Page 2.)

F. Luan et al., "Deep Photo Style Transfer," arXiv preprint arXiv:1703.07511v3, 11 Apr. 2017 ("Luan et al. 2017"), describes a deep-learning approach to photographic style transfer that can faithfully transfer the reference style in a broad variety of scenarios, including transfer of the time of day, weather, season, and artistic edits. The approach can suppress distortion and yield satisfying photorealistic style transfer.

U.S. Pat. No. 9,576,351, entitled "Style transfer or headshot portraits," describes a method for transferring the style for headshot portraits. U.S. Pat. No. 9,594,977, entitled "Automatically selecting example stylized images for image stylization operations based on semantic content," describes a method for "content-based selection of style examples used in image stylization operations. For example, training images can be used to identify example stylized images that will generate high-quality stylized images when stylizing input images having certain types of semantic content." (Abstract.)

SUMMARY

To reduce the need for costly, tedious, and error-prone manual labeling of training data, embodiment of the present invention provides methods that use neural style transfer to transform existing training data into training data of the required style so that training labels can be reused to produce custom training data. The existing training data may be a general training dataset, or it may be another custom training dataset having a different style.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a method for training a deep neural network (DNN) to perform a specified task with respect to images having a target image style, which includes: (a) obtaining the DNN to be trained; (b) obtaining an original training dataset, which includes a plurality of original training images and a training label for each original training image, the original training images having image styles different from the target image style; (c) obtaining an image having the target image style; (d) using the image having the target image style as a style target image, training a style transformer network to perform a style transformation that transforms any photorealistic input image into a transformed image that has contents of the input image, maintains photorealistic quality of the input image, and has an image style that matches the image style of the style target image; (e) using the trained style transformer network to transform each of the original training images into a corresponding transformed training image; (f) labeling each transformed training image with the training label of the corresponding original training image to form an augmented training dataset; and (g) using the augmented training dataset to train the DNN to perform the specified task.

In one embodiment, the training of the style transformer network in step (d) includes: providing a set of content target images; in each training iteration: providing an input image; selecting N of the content target images, wherein N is a predetermined natural number; using the style transformer network to transform the input image into a transformed image; processing the transformed image, the style target image and each of the N content target images using a loss network which is a convolutional neural network (CNN) that has been trained for image recognition; computing a style loss by comparing processing results of the style target image and the transformed image from each of a first set of selected convolutional layers of the CNN; computing a content loss by comparing processing results of each of the N content target images and the transformed image from each of a second set of selected convolutional layers of the CNN; computing a photorealism loss of the transformed image; and computing a total loss which is a weighed combination of the style loss, the content loss and the photorealism loss; and training the style transformer network through multiple training iterations using stochastic gradient descent to minimize the total loss; wherein the loss network is fixed for all training iterations.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
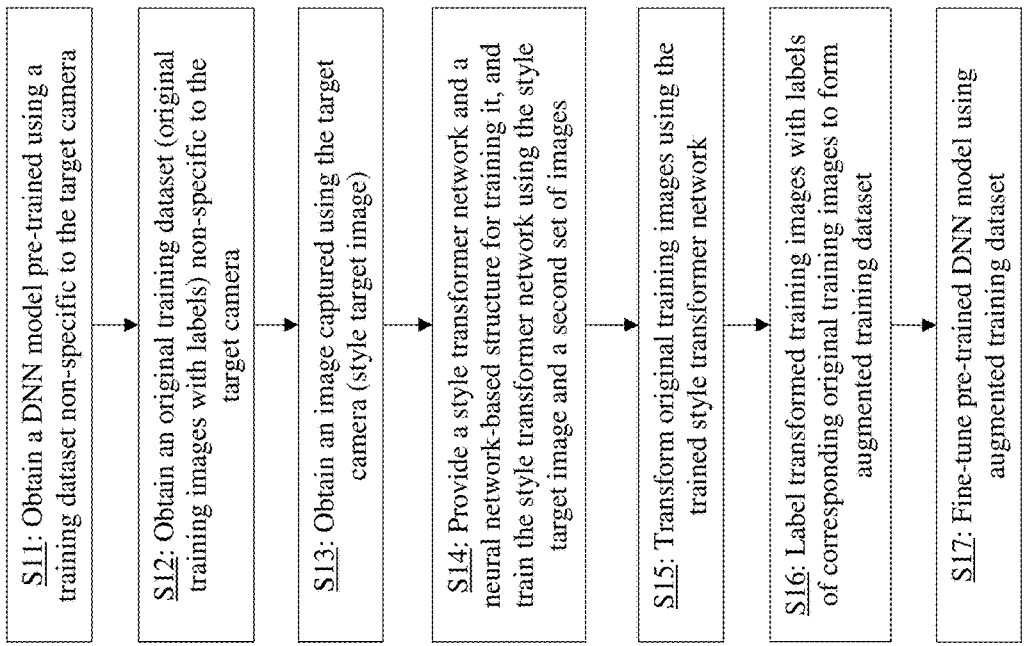
FIG. 1 schematically illustrates a data augmentation method according to an embodiment of the present invention for training a DNN model to perform a specified task with respect to images captured by a target camera.

According to embodiments of the present invention, neural style transfer techniques are used to augment training data for targeted image recognition and detection task. Neural style transfer is used to transform existing training images into training images of a target style to allow reuse of training labels. It can generate realistic training images in a fast and photorealistic way.

One example of an application scenario is in a video surveillance system where a deep neural network (DNN) has been trained to detect particular objects, such as humans, in images taken by a particular camera A. The training data used for training the DNN are labeled images taken by camera A. If such a trained DNN is used directly (i.e. without re-training or further fine-tuning) to process images taken by another camera B, where camera B is of a different type and/or model and has different imaging characteristics from camera A, or where camera B is installed at a location that has a different lighting condition from camera A, etc., poor recognition performance may occur. This is because images taken by camera B have characteristics sampled from a different underlying probability distribution, thus may have a different image style from those taken by camera A, i.e. there is a mismatch in style between images taken by the different cameras.

In this disclosure, the term style broadly encompasses various factors, including low-level (local) image statistics such as textures, edge contrast, etc., and global factors such as effects caused by lighting condition, noise pattern introduced by imaging process by the camera, color characteristics (different cameras may have different hues), etc. In the particular application scenario described here, achieving particular artistic styles is not a goal or concern.

Thus, in order to reuse the trained DNN to process images taken by camera B while remedying the performance degradation, fine-tuning (transfer learning) of the trained model is desired by using training images taken by camera B. However, using new images taken by camera B for training would require manual labeling of such images.

Embodiments of the present invention provide a method of generating training data for fine-tuning a DNN model to perform a specified task (e.g. human or object recognition) on images taken by a particular camera ("target camera"), by utilizing existing labeled training images taken by other cameras that are not the target camera, and transforming the existing training images which have styles of the other cameras into transformed training images having a style of the target camera, while maintaining the semantic contents of the images being transformed, so that the existing training labels can be reused. The DNN model can then be fine-tuned using the transformed training images along with the existing labels. This reduces or eliminates the need to manually label training images taken by the target camera.

In this disclosure, the term camera broadly refers to any suitable image capture devices, including visible light cameras, IR cameras, still cameras, video cameras, etc.

FIG. 1 schematically illustrates a method according to an embodiment of the present invention, for training a DNN model to perform a specified task (e.g. recognizing humans or human actions or other specified objects) with respect to images captured by a target camera. The method starts with the DNN model to be trained (step S11), and an original training dataset which is not specific to the target camera (step S12). The original training dataset includes original training images captured using other cameras that are not the target camera, along with labels for the training images.

In preferred embodiments, the DNN has been constructed and pre-trained to perform the specified task, but using a training dataset that is not specific to the target camera (e.g. the training images were not captured by the target camera). For example, the DNN may have been pre-trained using the original training dataset referred to in step S12, or some other training dataset.

An image captured by the target camera is obtained (step S13). A style transformer network is provided, along with a network-based structure used for training the style transformer network (step S14). Note that in this disclosure, the term "network" refers to an artificial neural network unless otherwise stated. The image captured by the target camera in step S13 (referred to as the style target image) and a second set of images (referred to as the content target images) are used to train the style transformer network, so that the style transformer network learns to perform a style transformation that can transform an input image into a transformed image that (1) keeps the contents of the input image, (2) maintains the photorealistic quality of the input image, but (3) have a style that matches the style of the style target image (step S14).

After the style transformer network is trained, it is used to transform the original training images obtained in step S12 into transformed training images (step S15). As a result, the transformed training images will have the contents of the original training images but the style of the style target image (i.e. the image captured by the target camera in step S13). Then, each transformed training image is labeled with the same label as the corresponding original training image, so as to form an augmented training dataset (step S16). This augmented training dataset can now be used to train (fine-tune) the DNN model obtained in step S11 for the task with respect to images captured by the target camera (step S17).

Note that the second set of images (the content target images) used to train the style transformer network in step S14 may preferably be the same as the original training images or a part thereof, or a different set of images.

Figure 2:
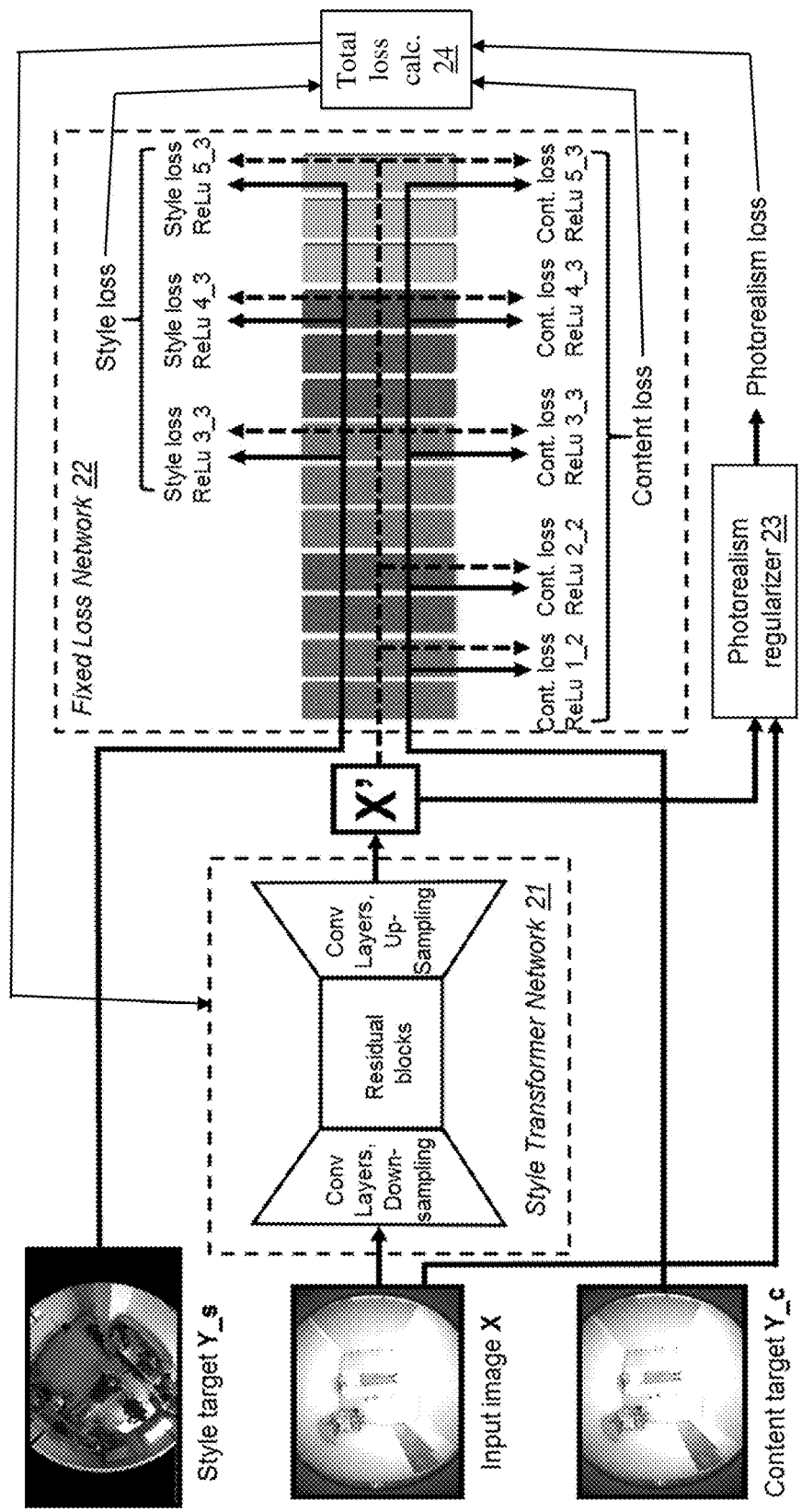
FIG. 2 schematically illustrates a neural network architecture according to an embodiment of the present invention, which is used to train a style transformer network to be used in the data augmentation method of FIG. 1.

FIG. 2 schematically illustrates a neural network architecture that is used to train the style transformer network and related training method in step S14. The network architecture includes the style transformer network 21 being trained, a fixed loss network 22, a photorealism regularizer 23, and a total loss calculator 24.

The style transformer network 21 and the loss network 22 are adapted from Johnson et al. 2016 (see Supplementary Material of that paper) with modifications. The style transformer network 21 is a feed-forward convolutional neural network with (or without) residual connections. This network can be trained to perform style transformation for different target styles, where each target style needs to be separately trained for. In a preferred embodiment, the style transformer network 21 includes the following series of layers:

32×9×9 Conv with stride 1
64×3×3 Conv with stride 2
128×3×3 Conv with stride 2
(128×3×3 Conv→Batch Norm→ReLu→128×3×3 Conv→Batch Norm→ReLu)×5
64×3×3 conv with stride 1/2
32×3×3 conv with stride 1/2
3×9×9 conv with stride 1

In the above notations, "Conv" denotes a convolutional layer; in "32×9×9", 32 is the depth of the layer and 9×9 is the filter size of the convolution; the "stride" of the convolution is the number of pixels the filter is laterally slid by at a time in the convolution (the layers with stride 2 are down-sampling layers and those with stride 1/2 are up-sampling layers); "Batch Norm" denotes a spatial batch normalization layer, and "ReLu" denotes a Rectified Linear Unit layer. Note that the five groups of layers in the middle are expressed in an equivalent form of groups without residual connections. Alternatively, these groups may contain residual connections.

The loss network 22 is also a convolutional neural network, used to compute the style loss and content loss of the transformation performed by the style transformer network 21. The loss network 22 is pre-trained for image classification, and remains fixed during training of the style transformer network 21. The loss network 22 may be pre-trained using a general training dataset such as the ImageNet; it may be further fine-tuned on the content target images (assuming the content target images are a part of a labeled training dataset, for example, when they are the same as the original training images). When the content target images are significantly different from those in the general training dataset, further fine-tuning of the loss network using the content target images is helpful because it enables the loss network to capture features present in the content target images but not in the general training dataset.

In one embodiment, the loss network 22 is adapted from a VGG-16 network, which is described in detail in K. Simonyan et al., Very Deep Convolutional Networks For Large-Scale Image Recognition, ICLR 2015 ("Simonyan et al. 2015"). The loss network 22 includes five major groups of convolutional layers, with maxpooling between groups. Note that a VGG-16 network also includes a number of fully connected layers and a soft-max layer after the convolutional layers, but these layers are not used in the loss network 22.

During training of the style transformer network 21, the input into the network system in each training iteration includes: the style target image $Y\_s$, a content target image $Y\_c$, and an input image X. The style target image $Y\_s$ is the same for all training iterations and represents the style that the style transformer network is training for. Each iteration uses an image from an image set (e.g. the second set of images mentioned in step S14 above) as the content target image $Y\_c$. The input image X in each iteration is preferably the same as or similar to the content target image $Y\_c$, but it can also be a different image, or even a random noise image. In a preferred embodiment, where the content images from the second set of images are still images, the input image X is the same as the content target image $Y\_c$, i.e. $X=Y\_c$. Initializing input X as the content target $Y\_c$ gives better stylized output than starting from random noise image as input X. In another preferred embodiment, where the content images for a number of training iterations are sequential frames of a video clip, the input image X for one iteration can be the transformed output X' for the immediate previous frame, i.e. X'_{t−1} from the previous training iteration, with the content target Y_c being the current frame image.

The input image X (with padding if needed) is inputted into the style transformer network 21, which generates a transformed image X' in a forward pass. The transformed image X', the style target image Y_s and the content target image Y_c are inputted into the loss network 22. The loss network 22 processes each of the three images individually and compares the processing results to compute (1) a style loss which represents the discrepancy of the style of the transformed image X' with respect to the style target image Y_s, and (2) a content loss which represents the discrepancy of the content of the transformed image X' with respect to the content target image Y_c. Meanwhile, the transformed image X' is input into the photorealism regularizer 23 which computes a regularization (a photorealism loss) which represents how photorealistic the transformed image X' is. The total loss of the transformation is defined as a weighted combination of the style loss, the content loss and the photorealism loss. The style transformation network 21 is trained in multiple iterations using stochastic gradient descent to minimize the total loss.

In a preferred embodiment, the methods of computing the style loss and the content loss are adapted from those described in Johnson et al. 2016. More specifically, the style loss is computed using the activations of each of one or more selected layers of the loss network 21. At each selected layer j, a Gram matrix is defined, which is a $C_j$ by $C_j$ matrix whose elements are (Eq. (3) of Johnson et al. 2016):

$$G_j^\phi(x)_{c,c'} = \frac{1}{C_j H_j W_j} \sum_{h=1}^{H_j} \sum_{w=1}^{W_j} \phi_j(x)_{h,w,c} \phi_j(x)_{h,w,c'}.$$

where $C_j$, $H_j$, and $W_j$ are the depth, height and width of the feature map of the j-th layer, and $\phi_j(\chi)$ is the activation of the j-th layer of the network $\phi$ for the input $\chi$. The style loss from the j-th layer is then the squared Frobenius norm of the difference between the Gram matrices of the transformed image X' and of the style target images Y_s (Eq. (4) of Johnson et al. 2016):

$$l_{style}^{\phi,j}(\hat{y}, y) = \|G_j^\phi(\hat{y}) - G_j^\phi(y)\|_F^2.$$

where $l_{style}^{\phi,j}(\hat{y}, y)$ is the style loss from the j-th layer, and $\hat{y}$ and y represent the transformed image X' and the style target image Y_s, respectively. The style loss of the transformer is a weighted sum of the style losses from all of the selected layers.

The content loss is also computed using the activations of each of one or more selected layers (which may be different from the selected layers used for style loss) of the loss network 21. The content loss from each selected layer j is the (squared, normalized) Euclidean distance between feature representations for the transformed image X' and the content target image Y_c (see Eq. (2) of Johnson et al. 2016)

$$l_{feat}^{\phi,j}(\hat{y}, y) = \frac{1}{C_j H_j W_j} \|\phi_j(\hat{y}) - \phi_j(y)\|_2^2$$

where $l_{feat}^{\phi,j}(\hat{y}, y)$ is the content loss (referred to as the "feature reconstruction loss" in Johnson et al. 2016) from the j-th layer, and $\hat{y}$ and y represent the transformed image X' and the content target image Y_c, respectively. The content loss of the transformer is a weighted sum of the content losses from all of the selected layers.

In preferred embodiments of the present invention, the content losses are computed at layers ReLu1_2, ReLu2_2, ReLu3_3, ReLu4_3 and ReLu5_3, i.e., at the last layer of all five major groups of convolutional layers of the loss network; the style losses are computed at layers ReLu3_3, ReLu4_3, and ReLu5_3 only.

Note that in the example given in FIG. 2 of Johnson et al. 2016, the style losses are computed at layers ReLu1_2, ReLu2_2, ReLu3_3, and ReLu4_3 of the VGG-16 loss network, and the content loss is computed at layer ReLu3_3 only. One reason for the difference between the preferred embodiment and the example given in Johnson et al. 2016 is that the purpose of the style transformer in Johnson et al. 2016 is artistic style transfer, where artistic style preservation is more important than content preservation. On the other hand, for embodiments of the present invention, because the purpose of the image transformation is for data augmentation, it is important to preserve the content of the input image as much as possible while only applying a different style globally. For this reason, the content loss is computed from all major groups of layers of the loss network. For style, the global features of the style target image are of more interest, so the style loss is computed form only the last thee major groups of layers. In other words, the details of the style target image are not of interest so the first two groups are not used to computer style loss.

The photorealism loss can be computed by Matting Laplacian constructed from the transformed image X'. In a preferred embodiment, the method of computing the photorealism loss by the photorealism regularizer 23 is adapted from Luan et al. 2017. The regularization term, i.e. the photorealism loss, is (Eq. (2) in Luan et al. 2017):

$$\mathcal{L}_m = \sum_{c=1}^{3} V_c[O]^T \mathcal{M}_I V_c[O]$$

where $V_c[O]$ is a vectorized version of the image O (the transformed image X') in color channel c, and $\mathcal{M}_I$ is a matrix representing a least-squares penalty function which only depend on the input image I of the transformer (i.e. the input image X in FIG. 2).

Note that in the above equation, the summation is over the three color channels (e.g. RGB). In some embodiments of the present invention, the images being processed are grayscale images which have only one color channel.

The reason for including the photorealism loss in the total loss is that the transformed images are to be used as training images to train a neural network to process real images, so the transformed images should remain photorealistic.

The total loss of the transformation, calculated by the total loss calculator 24, is the weighted combination of the style loss, the content loss, and the photorealism loss. As described earlier, the style transformation network 21 is trained in multiple iterations using stochastic gradient descent to minimize the total loss.

Although in the above description each training iteration uses one content target image Y_c, the training may alternatively use a small subset of training images called a "minibatch" as the content targets (Y_c) in each iteration. The content loss of the transformed image X' with respect to each content target image Y_c in the minibatch is calculated and then averaged to obtain a mean content loss, which is combined with the style loss and photorealism loss to obtain the total loss. The choice of minibatch size N usually depends on the available memory of computing device (typically GPU), and is usually set to power of 2, so 1, 4, 16, 32, 64, 128 are commonly used.

The output of the training process is a trained style transformer network 21 capable of applying the style of the style reference image onto other input images. Once trained, it can transform an input image with a single feed-forward pass. Thus, for example, step S15 of FIG. 1 can be done by batch forward computing of the original training images (obtained in step S12) through the style transfer network 21 to obtain the augmented training dataset.

In some embodiments, steps S13 to S16 may be repeated, so a style transfer network is trained using another image captured by the target camera as the style target image, and then used to transform the original training images to generate another set of transformed training images with labels. Using such additional augmented training datasets in the fine-tuning step S17 may increase the final generalizability of the DNN model.

Some advantages of the above-described data augmentation method include: Elimination of manual labeling for the custom training dataset; reduction of required collection of samples from the target image capture device; and fast and photorealistic style transfer by combining the fixed loss network and the photorealism regularizer in the training system for the style transformer network.

The data augmentation method may be applied to applications other than fine-tuning a DNN to process images taken by a target camera. For example, if the training and testing images are taken by the same camera but at different times of the day (e.g. day vs night) or in different weather conditions (e.g. sunny vs cloudy) or different seasons of the year (summer vs winter), it can be used to augment the training data to accommodate a different background style. The same applies for different indoor lighting conditions (light color, intensities). It can also be used to augment appearance of foreground objects, e.g. augment a training dataset of flower images into different color and texture. More generally, the method is applicable to applications where the images to be processed by the DNN have a particular style, but images in the training dataset have different styles.

The neural networks described above may be implemented as software, firmware, hardware, or a combination of them, such as a computer system including processors and memories storing computer executable programs, special purpose logic circuitry such as FPGA (field programmable gate array) and ASIC (application specific integrated circuit), etc. Each of the components of the system may be implemented as a computer program module executed by processors. The system that the neural network is implemented on is generally referred to as a data processing system.

It will be apparent to those skilled in the art that various modification and variations can be made in the target data augmentation method using style transformation and related apparatus of the present invention without departing from the spirit or scope of the invention. Thus, it is intended that the present invention cover modifications and variations that come within the scope of the appended claims and their equivalents.

What is claimed is:

1. A method for training a deep neural network (DNN) to perform a specified task with respect to images having a target image style, comprising:
    (a) obtaining the DNN to be trained;
    (b) obtaining an original training dataset, which includes a plurality of original training images and a training label for each original training image, the original training images having image styles different from the target image style;
    (c) obtaining an image having the target image style;
    (d) using the image having the target image style as a style target image, training a style transformer network to perform a style transformation that transforms any photorealistic input image into a transformed image that has contents of the input image, maintains photorealistic quality of the input image, and has an image style that matches the image style of the style target image, wherein the style transformer network is distinct from the DNN to be trained;
    (e) using the trained style transformer network to transform each of the original training images into a corresponding transformed training image;
    (f) labeling each transformed training image with the training label of the corresponding original training image to form an augmented training dataset; and
    (g) using the augmented training dataset to train the DNN to perform the specified task.

2. The method of claim 1, wherein the images having the target image style are images captured by a target image capture device, wherein in step (b) the original training images have been captured by image capture devices other than the target image capture device, and wherein in step (c) the image having the target image style is an image captured by the target image capture device.

3. The method of claim 1, wherein the style transformer network is a feed-forward convolutional neural network comprising a first set of convolutional layers performing down-sampling, a second set of convolutional layers, and a third set of convolutional layers performing up-sampling, and
    wherein in step (e) the trained style transformer network transforms each original training images into a corresponding transformed training image in a forward pass.

4. The method of claim 1, wherein the training of the style transformer network in step (d) comprises:
    providing a set of content target images;
    in each training iteration:
        providing an input image;
        selecting N of the content target images, wherein N is a predetermined natural number;
        using the style transformer network to transform the input image into a transformed image;
        processing the transformed image, the style target image and each of the N content target images using a loss network which is a convolutional neural network (CNN) that has been trained for image recognition;
        computing a style loss by comparing processing results of the style target image and the transformed image from each of a first set of selected convolutional layers of the CNN;
        computing a content loss by comparing processing results of each of the N content target images and the transformed image from each of a second set of selected convolutional layers of the CNN;

computing a photorealism loss of the transformed image; and computing a total loss which is a weighed combination of the style loss, the content loss and the photorealism loss; and training the style transformer network through multiple training iterations using stochastic gradient descent to minimize the total loss;

wherein the loss network is fixed for all training iterations.

5. The method of claim 4, wherein in each training iteration, N=1 and the input image is the same as the content target image.

6. The method of claim 4, wherein the content target images for a plurality of training iterations are sequential image frames of a video clip, and wherein N=1 and the input image for each of the plurality of training iterations is the transformed image of a previous image frame generated in a previous training iteration.

7. The method of claim 4, wherein the CNN includes five groups of convolutional layers, wherein the first set of selected convolutional layers used to compute the style loss consists of the last convolutional layer of each of last three of the five groups, and wherein the second set of selected convolutional layers used to compute the content loss consists of the last convolutional layer of each of the five groups.

8. The method of claim 4, wherein the photorealism loss is computed by a Matting Laplacian constructed from the transformed image.

9. The method of claim 4, wherein the CNN has been trained for image recognition using the set of content images as training data.

10. The method of claim 1, wherein the DNN obtained in step (a) has been pre-trained to perform the specified task using a training dataset that is not specific to the target camera.

11. The method of claim 1, wherein the DNN obtained in step (a) has been pre-trained using the original training dataset.

* * * * *